United States Patent
Uenohara

[11] Patent Number: 5,901,825
[45] Date of Patent: May 11, 1999

[54] MODULAR CLUTCH

[75] Inventor: Norihisa Uenohara, Neyagawa, Japan

[73] Assignee: Exedy Corporation, Neyagawa, Japan

[21] Appl. No.: 08/887,850

[22] Filed: Jul. 3, 1997

[30] Foreign Application Priority Data

Jul. 10, 1996 [JP] Japan ................................. 8-180936

[51] Int. Cl.⁶ ........................................... F16D 13/00
[52] U.S. Cl. ............................. 192/70.13; 192/70.17
[58] Field of Search ...................... 192/70.13, 70.16, 192/70.17; 74/574, 572; 464/101, 162

[56] References Cited

U.S. PATENT DOCUMENTS

| 4,635,776 | 1/1987 | Billet et al. ...................... 74/572 X |
| 5,279,183 | 1/1994 | Forster et al. ...................... 74/572 |
| 5,407,047 | 4/1995 | Weidinger et al. ................. 192/70.13 |
| 5,480,016 | 1/1996 | Kurz et al. ........................ 192/70.16 |
| 5,511,446 | 4/1996 | Kajitani et al. .................... 74/572 X |
| 5,524,739 | 6/1996 | Baier et al. ....................... 192/70.16 |
| 5,551,318 | 9/1996 | Fukushima ........................... 74/574 |
| 5,645,150 | 7/1997 | Kajitani et al. .................. 192/70.16 |

FOREIGN PATENT DOCUMENTS

4334972A1   3/1995   Germany .

*Primary Examiner*—Rodney H. Bonck
*Attorney, Agent, or Firm*—Shinjyu An Intellectual Property Firm

[57] ABSTRACT

In order to remove readily a modular clutch, a clutch device 1 is installable on a crankshaft 60 as a modular unit which transmits torque to an input shaft 50 of a transmission. A center bolt 70 is provided with a flange 71 having a diameter greater than a center hole 3d of a flexible plate 3 and disposed on the transmission side of a flexible plate 3 and is provided with a sleeve-like fastening portion 72 which extends from the flange 71 through the center hole 3d and may be coupled with the crankshaft 60.

7 Claims, 9 Drawing Sheets

MODULAR CLUTCH

BACKGROUND OF THE INVENTION

1. Field of the Invention

The present invention relates to a clutch assembly, and more particularly to a modular clutch assembly having a flywheel, a clutch cover assembly and a clutch disc which may be installed and removed from an engine as a single unit.

2. Description of the Related Art

Typically, a clutch mechanism includes a flywheel mounted to the crankshaft of an engine, a separate clutch cover assembly fixed to the flywheel and a clutch disc assembly disposed between the flywheel and the clutch cover assembly. The flywheel is typically bolted to the crankshaft of the engine and the clutch cover assembly is usually fixed to the crankshaft of the engine by fastening means such as bolts. More specifically, a flange portion formed on an outer circumferential portion of the clutch cover assembly is formed with apertures which are configured to receive bolts which extend therethrough and thread into threaded holes formed in an outer circumferential portion of the flywheel.

Recently, a modular clutch has been developed in which the flywheel, the clutch cover assembly and the clutch disc assembly are assembled an one, single unitary module. Since the modular clutch as a whole is one assembly, it is easy to manipulate the module as a single part and to mount the module onto the crankshaft.

A method for fastening the modular clutch to the crankshaft of the engine includes, for example, the steps of forming holes in a diaphragm spring of the clutch cover assembly and a plate of the clutch disc assembly, causing bolts to pass through the holes from a transmission side, and fixing the flywheel to the crankshaft by the bolts.

When the modular clutch is to be removed from the crankshaft, it is only necessary to align the positions of the clutch disc assembly with the holes of the bolts and then remove the bolts. However, moving the clutch disc assembly to align the holes with the bolts can be very troublesome.

SUMMARY OF THE INVENTION

An object of the present invention is to facilitate easy removal of a modular clutch from a crankshaft.

In accordance with one aspect of the present invention, a modular clutch assembly includes a flywheel formed with a center hole and a radially extending friction surface. A clutch cover assembly is fixed to the flywheel. A pressure plate is supported within the clutch cover and the pressure plate is formed with a pressure surface facing the friction surface. A diaphragm spring is supported within the clutch cover assembly biasing the pressure plate toward the friction surface. A clutch disc assembly having a friction facings is interposed between the friction surface and the pressure surface. The clutch disc assembly is also formed with a hub having a spline hole configured to engage a transmission input shaft. A center bolt is formed with a flange and a threaded portion, the flange being disposed on one side of the flywheel and the threaded portion extending through the center hole. The threaded portion is configured for engagement with corresponding threads in a crankshaft of an engine such that the center bolt attaches the modular clutch assembly to the crankshaft of the engine.

Preferably, the flywheel includes an annular inertia mass and a flexible plate having an outer circumferential portion fixed to the inertia mass. The flexible plate is formed with the center hole, and the flexible plate is formed with a protruding engagement portion for engaging a corresponding recess formed in the crankshaft to prevent relative rotation between the crankshaft and the flexible plate.

Preferably, the flywheel further includes a flywheel member and a damper assembly disposed between the inertia mass and the flywheel member. The flywheel member is formed with the friction surface, and the damper assembly allows only limited relative rotary displacement between the flywheel member and the inertia mass.

Preferably, the flexible plate is formed with a conical shaped hub defining a radially inner tapered surface that is configured to engage a corresponding surface formed on the crankshaft. The conical shaped hub has a disc portion formed at one end thereof, the one end having an inner diameter that is smaller than the smallest diameter of the corresponding surface formed on the crankshaft. With the tapered surface engaged with the crankshaft and the center bolt tightly threaded into the crankshaft, the disc portion is spaced apart from an end of the crankshaft.

Alternatively, the flywheel is formed with a protruding engagement portion for engaging a corresponding recess formed in the crankshaft to prevent relative rotation between the crankshaft and the flywheel.

Alternatively, the flywheel is formed with a conical shaped hub defining a radially inner tapered surface that is configured to engage a corresponding surface formed on the crankshaft. The conical shaped hub has a disc portion formed at one end thereof. The one end has an inner diameter that is smaller than the smallest diameter of the corresponding surface formed on the crankshaft, wherein with the tapered surface engaged with the crankshaft and the center bolt tightly threaded into the crankshaft, the disc portion is spaced apart from an end of the crankshaft.

In accordance with another aspect of the present invention, a modular clutch assembly includes a flywheel assembly having a flexible plate, an inertia mass attached to an outer circumference of the flexible plate, a damper assembly attached to the inertia mass and a flywheel member attached to the damper assembly. The damper assembly is configured to allow limited relative rotary displacement between the inertia member and the flywheel member. The flexible plate is formed with a center hole and the flywheel member has a radially extending friction surface. A clutch cover assembly is fixed to the flywheel member. a pressure plate supported within the clutch cover. The pressure plate is formed with a pressure surface facing the friction surface. A diaphragm spring is supported within the clutch cover assembly biasing the pressure plate toward the friction surface. A clutch disc assembly has a friction facings interposed between the friction surface and the pressure surface, the clutch disc assembly further formed with a hub having a spline hole configured to engage a transmission input shaft. A center bolt is formed with a flange and a threaded portion, the flange being disposed on one side of the flywheel and the threaded portion extending through the center hole. The threaded portion is configured for engagement with corresponding threads in a crankshaft of an engine such that the center bolt attaches the modular clutch assembly to the crankshaft of the engine.

Preferably, the flexible plate is formed with a protruding engagement portion for engaging a corresponding recess formed in the crankshaft to prevent relative rotation between the crankshaft and the flexible plate.

Alternatively, the flexible plate is formed with a conical shaped hub defining a radially inner tapered surface that is configured to engage a corresponding surface formed on the crankshaft. The conical shaped hub has a disc portion formed at one end thereof, the one end having an inner diameter that is smaller than the smallest diameter of the corresponding surface formed on the crankshaft. With the tapered surface engaged with the crankshaft and the center bolt tightly threaded into the crankshaft, the disc portion is spaced apart from an end of the crankshaft.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

The present invention will now be described with reference to the accompanying drawings.

FIRST EMBODIMENT

Figure 1:
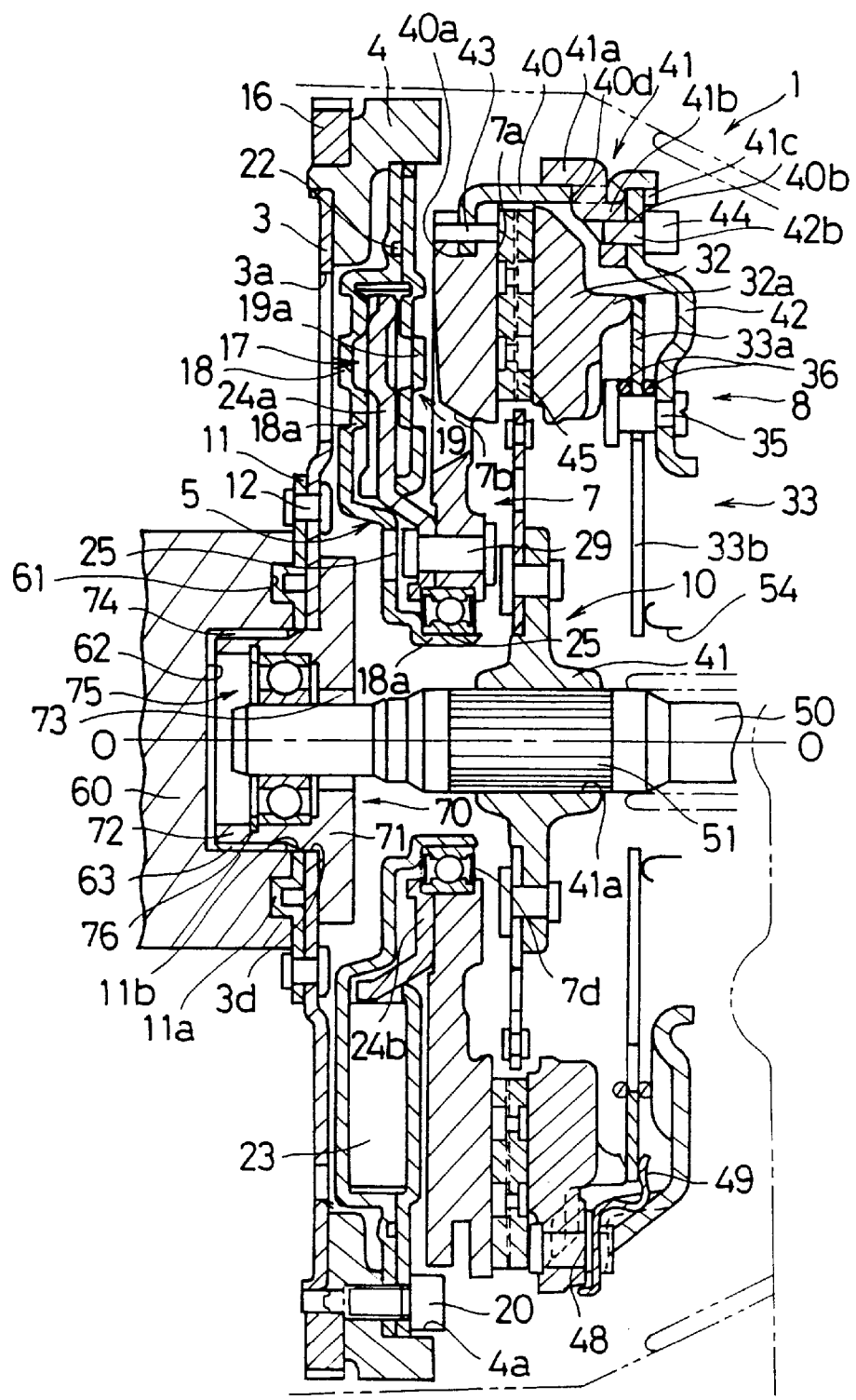
FIG. 1 is a fragmentary, cross sectional side view showing a clutch device according to a first embodiment of the present invention.
Figure 2:
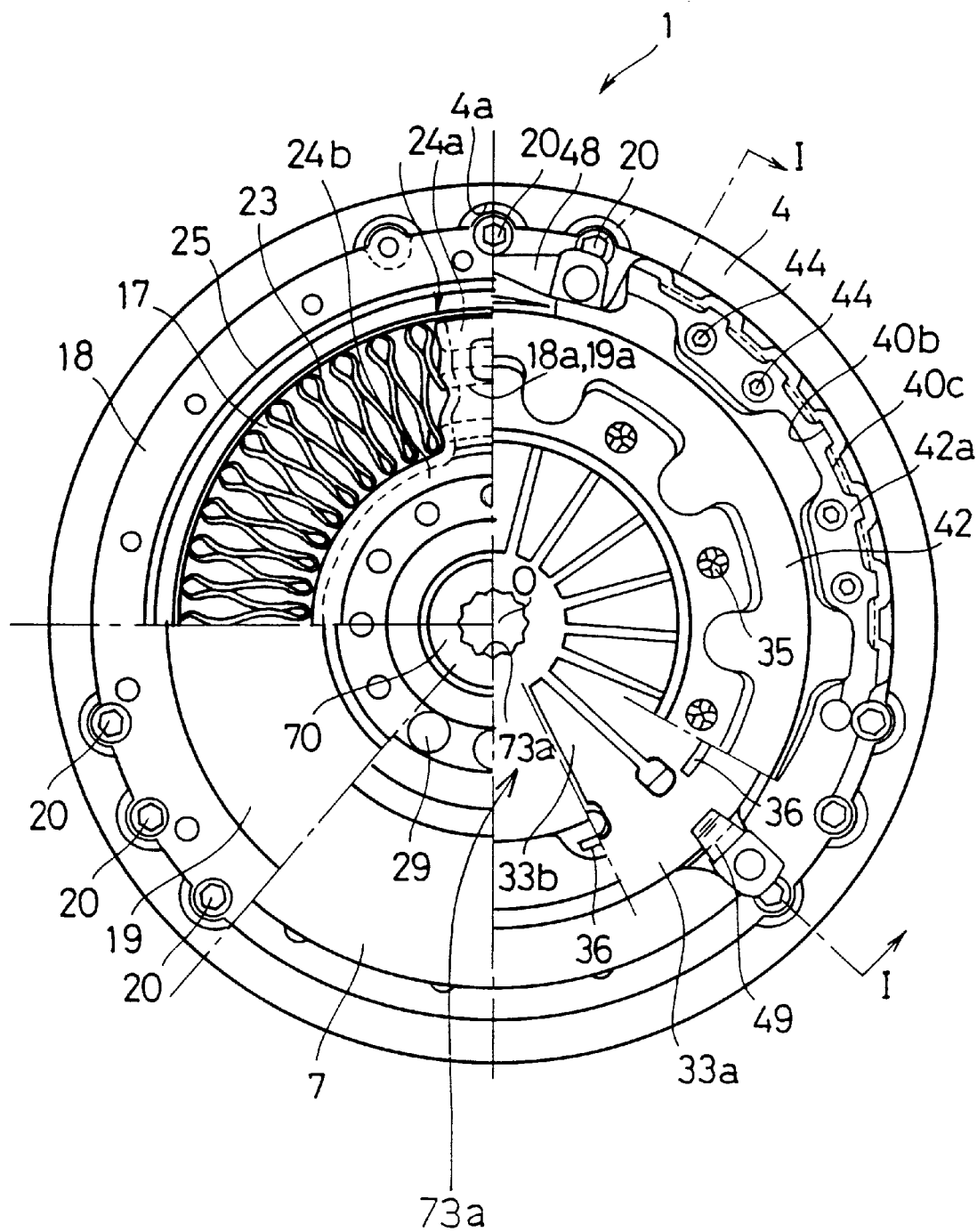
FIG. 2 is a part cutaway, part elevational view showing details of the clutch device depicted in FIG. 1.

A clutch device 1 in accordance with a first embodiment of the invention shown in FIGS. 1 and 2 is mainly composed of a flexible plate 3, an inertia member 4, a viscous damper mechanism 5, a flywheel 7, a clutch cover assembly 8, a clutch disc assembly 10, and a center bolt 70. The clutch device 1 is of a modular clutch type that may be handled as a single module in combination with the above-specified components. An engine (not shown) is disposed on the left side of FIG. 1, and a transmission (not shown) is disposed on the right side of FIG. 1. Hereinafter, the right side of FIG. 1 will be referred to as the transmission side and the left side of FIG. 1 will be referred to as the engine side. The clutch device 1 serves to transmit and interrupt a torque between a crankshaft 60 on the engine side and an input shaft 50 on the transmission side.

The flexible plate 3 is a disc-like plate member in which a central hole 3d (second central hole) is formed. A disc-like plate member 11 is fixed to an inner circumferential portion thereof on the engine side by rivets 12. The disc-like plate 11 has a central hole 11b having the same diameter of the central hole 3d of the flexible plate 3 and further two projections 11a projecting toward the engine. The inner circumferential portion of the flexible plate 3 is fixed to the crankshaft 60 of the engine together with the plate member 11 by the center bolt 70, as described below. A plurality of round holes 3a formed in a radial intermediate portion of the flexible plate 3 at equally spaced apart intervals in the circumferential direction. The flexible plate 3 has a generally high rigidity in the circumferential direction but may be flexible in the bending direction.

The annular inertia member 4 is fixed to an outer circumferential edge of the flexible plate 3 by rivets (not shown). A ring gear 16 is fixed to the inertia member 4.

The viscous damper mechanism 5 is mainly composed of a first input plate 18, a second input plate 19, a undulated spring 23 and a driven member 24. The first input plate 18 is a disc-like plate member disposed on one side of the flexible plate 3. The outer circumferential portion of the first input plate 18 is in contact with an inner circumferential surface of the inertia member 4. The inner circumferential portion of the first input plate 18 forms an inner circumferential projection 18a extending toward the transmission side. A radial intermediate portion of the first input plate 18 forms an annular projection projecting toward the engine. The second input plate 19 is a disc-like plate member disposed on one side of the first input plate 18. An outer circumferential edge of the second input plate 19 is in contact with the inner circumferential surface of the inertia member 4. Also, the outer circumferential portion of the second input plate 19 and the outer circumferential portion of the first input plate 18 are in contact with each other and are fixed to each other by rivets (not shown). A seal ring 22 is disposed between the outer circumferential portions of the first and second input plates 18 and 19, respectively.

The outer circumferential portions of the first and second input plates 18 and 19 are fixed to the inertia member 4 by a plurality of bolts 20 in the circumferential direction. The bolts 20 are fastened from the transmission side. Also, grooves 4a are formed at the portions of the inertia member 4 corresponding to the respective bolts 20.

A spring receiving chamber 17 is defined between radially central portions the first input plate 18 and the second input plate 19. A pair of undulated springs 23 are disposed within the spring receiving chamber 17. The undulated springs 23 are each made from an elongated strip, preferably metal material, the elongated strip being bent repeatedly is an almost sinusoidal manner and has overall an arcuate shape as shown in FIG. 2. The undulated springs 23 and the walls of the spring receiving chamber 17 together define a plurality of viscous fluid filling spaces between loop sections in the bent portions of the springs 23.

The driven member 24 is a disc-like member which has engagement portions 24a extending within the spring receiving chamber 17 and which contact circumferential ends of the undulated springs 23. The first and second input plates 18 and 19 extend in the axial direction and have drawing work supporting portion 18a and 19a which contact the ends, in the circumferential direction, of the undulated springs 23.

The flywheel 7 is a disc-like member in which a central hole 7d (first center hole) and has an annular frictional surface 7a on the transmission side. A plurality of air communication holes 7b are formed radially inwardly from the frictional surface 7a in the flywheel 7. The inner circumferential edge of the flywheel 7 is fixed to the driven member 24 by rivets 29. Edges of the central hole 7d of the flywheel 7 and the hole of the driven member 24 are supported to the inner circumferential projection 18a of the first input plate 18 through a bearing 28.

The clutch cover assembly 8 is mainly composed of arcuate engagement plates 40, a receiving member 41, a clutch cover 42, a pressure plate 32, bolts 44, stud pins 35, two wire rings 36, and a diaphragm spring 33.

The arcuate engagement plates 40 are plate members extending from the outer circumferential portion of the flywheel 7 toward the transmission. There are three arcuate engagement plates 40 employed in the first embodiment, the three plates 40 when together have a cylindrical shape. Each arcuate engagement plate 40 has, on the engine side end, a fixture portion 40a extending into a groove formed in the outer circumferential surface of the flywheel 7. The fixture portion 40a is fixed to the flywheel 7 by pins 43. The front edge of the arcuate engagement plate 40 has a corrugated engagement portion where recesses 40b and projections 40c are formed alternatively as best shown in FIG. 2. Holes 40d are formed at a plurality of positions in each arcuate engagement plate 40 radially inward from fixture portion 40a but radially outward from the corrugated engagement portion defined by the recesses 40b and the projections 40c. A receiving member 41 is fixed to pass through the holes 40d. The receiving member 41 is disposed radially inside of the arcuate engagement plate 40 except for a contact portion 41a which extends through the holes 40d and contacts the outer circumferential surface of the arcuate engagement plate 40. The receiving member 41 is also formed with a seat 41b having bolt screw holes 41c. The seat 41b is in contact with an outer circumferential surface of a clutch cover 42, as is described below.

The clutch cover 42 is a disc-like plate member having a central opening with a large diameter. The clutch cover 42 has a plurality of projections 42a formed at an equal interval in the circumferential direction in the outer circumferential edge thereof. The projections 42a are inserted into the recesses 40b of the engagement portion of the arcuate engagement plate 40 from the transmission side, as shown in FIG. 2. The engagement between the projections 42b and the recesses 40b prevents relative rotation between the clutch cover 42 and the arcuate engagement plate 40. Bolt insertion holes 42b are formed at positions corresponding to screw engagement holes 41c of the seat 41b in the clutch cover 42. A tip end of each bolt 44 is threadedly engaged with the bolt screw hole 41c through the bolt insertion hole 42b.

The pressure plate 32 is an annular member disposed on the inner circumferential side of the arcuate engagement plates 40. A pressure surface 32a facing the frictional surface 7a of the flywheel 7 is formed on the pressure plate 32. An annular projection 32b projecting on the transmission side is formed on a surface, opposite from the pressure surface 32a, of the pressure plate 32. The pressure plate 32 is fixed to be unrotatable to the clutch cover 42 by strap plates 48 extending in the tangential direction between the respective arcuate plates 40 in the circumferential direction. The strap plates 48 allow the pressure plate 32 to undergo limited axial movement with respect to the clutch cover 42 but prevent rotation between the clutch cover 42 and the pressure plate 32.

The diaphragm spring 33 is a disc-like member interposed between the pressure plate 32 and the clutch cover 42, and includes an annular elastic portion 33a and a plurality of lever portions 33b extending radially inwardly from the elastic portion 33a. Each axial side of the inner circumferential portion of the elastic portion 33a are supported by the wire rings 36 as described below. The outer circumferential portion of the elastic portion 33a is in contact with the annular projection 33b of the pressure plate 32. Furthermore, the outer circumferential edge of the diaphragm spring 33 is retained against the annular projection 32b by the clip 48.

A plurality of stud pins 35 are fixed to the inner circumferential portion of the clutch cover 42 and extend toward the pressure plate 32. The pins 35 further penetrate holes in the diaphragm spring 33. The two wire rings 36 are supported on the stud pins 35 serve to support the diaphragm spring 33.

The clutch disc assembly 10 has a frictional facing 45 disposed between the frictional surface 7a of the flywheel 7 and the pressure surface 32a of the pressure plate 32. The frictional facing 45 is fixed to a hub 46 via a plate member. A transmission input shaft 50 extending from the transmission (not shown) is spline-engaged with the hub 46. A release device 54 is in contact with the ends of the lever portions 33b of the diaphragm spring 33 from the transmission side.

The center bolt 70 is a member which is installed into the modular clutch 1 prior to installation on the crankshaft 60. The center bolt 70 is part of the modular unit of the present invention. The center bolt 70 is composed of a flange 71 and a sleeve-like fastening portion 72 extending axially from the flange 71, as shown in FIG. 1. The flange 71 of the center bolt 70 is disposed between the inner circumferential portion of the flexible plate 3 and the first input plate 18 of the viscous damper mechanism 5. An axially aligned hole 73 is formed in the flange 71. The hole 73 has corrugations 73a that are configured for engagement with a tool or wrench (not shown), as shown in FIG. 2. A threaded screw 74 is formed on the outer circumference of the sleeve-like fastening portion 72. A bearing 75 is fixed to the inner circumferential portion of the sleeve-like fastening portion 72 by a snap ring 76. The snap ring 76 is fixed to the inner circumferential surface of the sleeve-like fastening portion 72 and is in contact with the end face, on the engine side, of the outer race of the bearing 75.

The crankshaft 60 and the transmission input shaft 50 will be explained and the interconnection of these components with the modular clutch 1 will further be explained below.

A circular central recess 62 is formed at the depicted end of the crankshaft 60 in FIG. 1. The recess 62 is formed with threads 63 which engage the threaded screw 74. Engagement recesses 61 are formed at two positions circumferentially spaced apart positions in the end face of the crankshaft 60 around the central recess 62.

Projections 11a of the plate member 11 extend into the engagement recess 61 of the crankshaft 60. The threaded screw 74 of the sleeve-like fastening portion 72 of the center bolt 70 is threadedly engaged with the threads 63 of the central recess 62 of the crankshaft 60. Under this condition, the flange 71 serves to clamp the inner circumferential portion of the plate member 11 and the inner circumferential portion of the flexible plate 3 together with the end face of the crankshaft 60. As a result, the inner circumferential portion of the flexible plate 3 is firmly coupled with the crankshaft 60 for transmission of the torque therebetween.

The transmission input shaft 50 extends from the transmission side of FIG. 1 with its tip end being supported by the bearing 75. The splines 51 formed in the transmission input shaft 50 are engaged with the spline holes 46a of the hub 46.

With such an arrangement, the torque of the hub 46 is transmitted to the transmission input shaft 50.

The operation of the clutch device 1 is described below.

When the crankshaft 60 on the engine side is rotated, the torque is transmitted to the flywheel 7 through the flexible plate 3 and the viscous damper mechanism 5, further transmitted to the clutch disc assembly 10 through the clutch coupling condition, and finally transmitted to the transmission input shaft 50.

In the case where the bending vibration is transmitted from the engine side, the flexible plate 3 may be deformed in the bending direction to thereby absorb the bending vibration.

When the twist vibration is transmitted from the engine side, the first and second input plates 18 and 19 and the flywheel 7 are rotated relative to each other in a cyclic manner. In this case, the undulated spring 23 is compressed in the circumferential direction, so that the viscous fluid filling space between the undulated spring 23 and the first and second input plates 18 and 19 in the spring receiving chamber 17 is compressed. As a result, the viscous resistance is generated to thereby attenuate the twist vibration.

A method of mounting the clutch device 1 onto the crankshaft 60 will now be described. The clutch device 1 when completely assembled as a module includes the flexible plate 3, the inertia member 4, the viscous damper mechanism 5, the flywheel 7, the clutch cover assembly 8, the clutch disc assembly 10, and the center bolt 70. The module is brought into contact with the crankshaft 60 from the transmission side of FIG. 1 such that the center bolt 70 contacts the end of the crankshaft 60. Subsequently, a tool is brought into engagement with the hole 73 and the corrugations 73a of the center bolt 70 through the center hole of the diaphragm spring 33 and the spline hole 46a of the hub 46. Under this condition, the tool is manipulated so that the sleeve-like fastening portion 72 of the center bolt 70 is screwed into the central recess 62 of the crankshaft 60. While threading the center bolt 70, the projections 11a of the plate member 11 are brought into engagement with the crankshaft 60 and then extend into the engagement recesses 61 of the crankshaft 60. Subsequently, further rotation of the center bolt 70 fixes the inner circumferential portion of the flexible plate 3 is fixed to the crankshaft 60. Thereafter, the transmission may be installed.

When the clutch device 1 is removed away from the crankshaft 60, the center bolt 70 is operated by the tool in the same way as in the mounting work. In this case, since it is sufficient to operate the center bolt 70 for removal, the removing work may be simplified.

The number of the mechanical parts is reduced by using the center bolt 70 in comparison with the plurality of bolts in the conventional case. Furthermore, it is unnecessary to form the conventional holes for inserting the bolts and tools in respective members.

In the foregoing embodiment, the three arcuate engagement plates 42 are used to form a sleeve shape as a whole. It is however possible to use an integral sleeve-like member. The one end of the sleeve-like member may be fixed to the flywheel by press-fitting or welding.

The twist vibration damper is not limited to the embodiment of the viscous damper mechanism 5 described above. It is possible to use a dry type damper that is composed of springs and a frictional resistance generating mechanism in combination. Also, it is possible to use a damper which is only composed of springs.

SECOND EMBODIMENT

Figure 3:
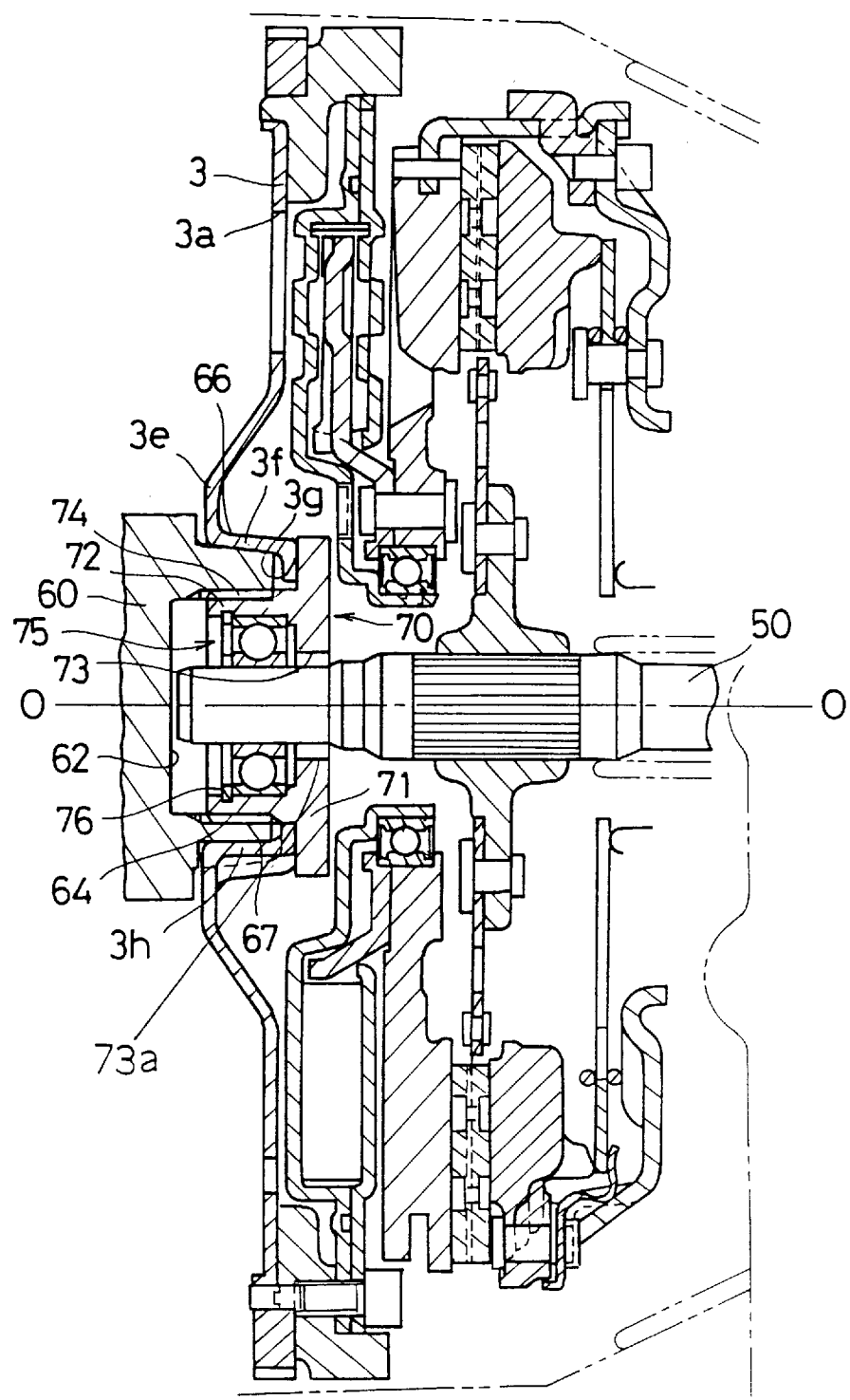
FIG. 3 is a fragmentary, cross sectional side view showing a clutch device according to a second embodiment of the present invention.

FIG. 3 shows a second embodiment. In the second embodiment, many features of the first embodiment are present. Therefore, only those features that are different from the first embodiment will be described. In the second embodiment, there is a coupling configuration between the clutch device 1 and the crankshaft 60 that differs from the first embodiment.

An annular bent portion 3e is formed in an inner circumferential portion of a flexible plate 3 by a drawing work. A wall surface of the inner circumferential portion of the annular bent portion 3e is formed into a tapered surface 3f that has a radius that increases toward the engine side. A disc portion 3g extending radially inwardly is formed in the inner circumferential side of the annular bent portion 3e. Furthermore, at least one projection 3h is formed in the tapered surface 3f that extends radially inwardly is formed at one position of the annular bent portion 3e.

A tapered surface 66 is formed on the crankshaft 60 which corresponds to the shape of the tapered surface 3f. The tapered surface 66 has a diameter that decreases toward the end of the crankshaft 60. At least one key groove 67 is formed at one position of the tapered surface 66. The projection 3h of the flexible plate 3 is fitted in the key groove 67 for preventing the crankshaft 60 and the flexible plate 3 from rotating relative with respect to each other. The tapered surface 3f of the flexible plate 3 is in contact with the tapered surface 66 of the crankshaft 60. When assembled on the crankshaft 60, the disc portion 3g is disposed between the end of the crankshaft 60 and a flange 71 of a center bolt 70 and is ideally only in contact with the flange 71 only.

Under the assembled condition shown in FIG. 3, a sleeve-like fastening portion 72 of a center bolt 70 is fastened to a central recess 62 of the crankshaft 60 so that the tapered surface 3f of the flexible plate 3 is urged toward the tapered surface 66 of the crankshaft 60. As a result, the engagement between the flexible plate 3 and the crankshaft 60 becomes more intimate and secure. The inner circumferential portion of the flexible plate 3 serves to prevent the center bolt 70 from being loosened between the flange 71 and the crankshaft 60.

THIRD EMBODIMENT

Figure 4:
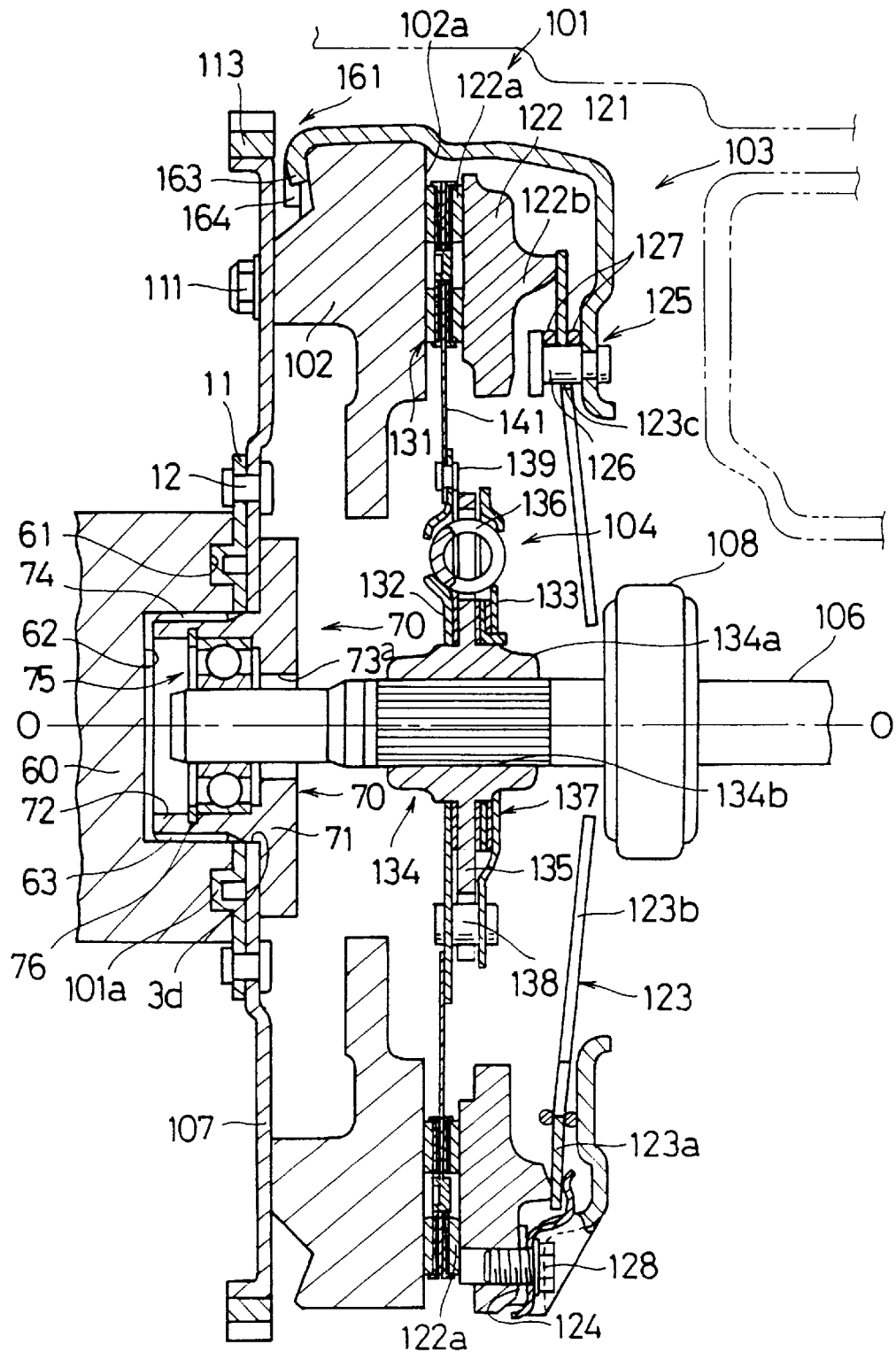
FIG. 4 is a fragmentary, cross sectional side view showing a clutch device according to a third embodiment of the present invention.

FIG. 4 shows a modular clutch 101 which is assembled as a module and includes a flywheel 102, a clutch cover assembly 103 and a clutch disc assembly 104. An engine is disposed on the left side of FIG. 4 and a transmission is disposed on the right side of FIG. 4. The line O—O of FIG. 4 indicates a rotary axis of the modular clutch 101.

The modular clutch 101 is a device for transmitting and interrupting a torque from the crankshaft 60 of the engine to the main drive shaft 106 extending from the transmission side.

A flexible plate 107 has a high rigidity in the rotational direction but is flexible in the bending or axial direction. Also, a ring gear 113 is fixed to an outer circumferential portion of the flexible plate 107. The flywheel 102 (described below) is fixed to an outer circumferential portion of the flexible plate 107 by a plurality of bolts 111. A release device 108 is disposed around a main drive shaft 106, the release device 108 being movable in the axial direction. The release device 108 can engage a diaphragm spring 123 (described below) of the clutch cover assembly 103.

The flywheel 102 is a substantially annular shaped member and has a flat frictional surface 102a on its side surface on the transmission side.

Figure 5:
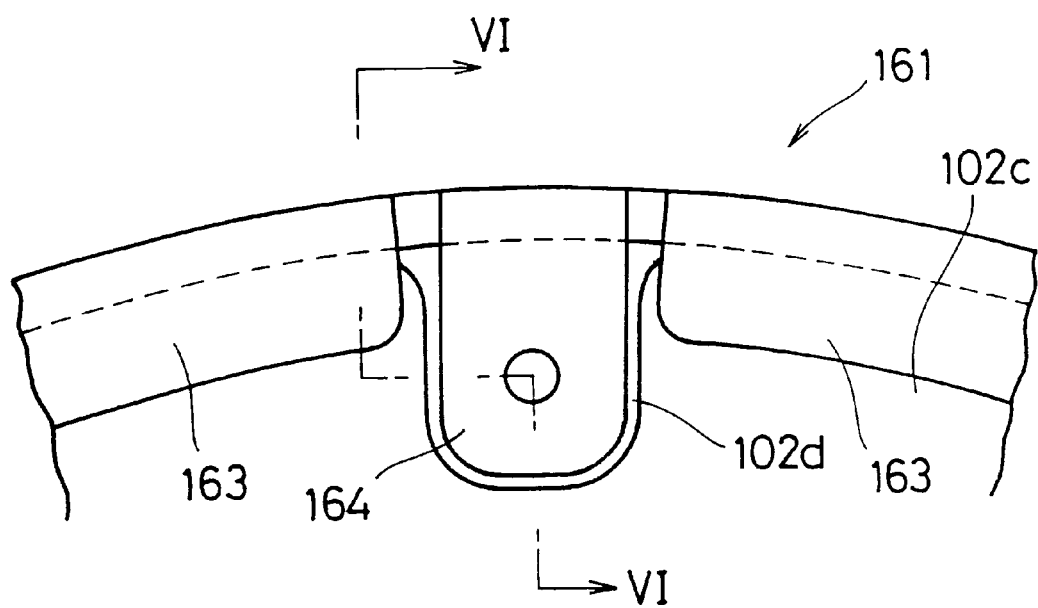
FIG. 5 is a fragmentary end view showing a fixture portion between a clutch cover and a flywheel of the clutch device depicted in FIG. 4.
Figure 6:
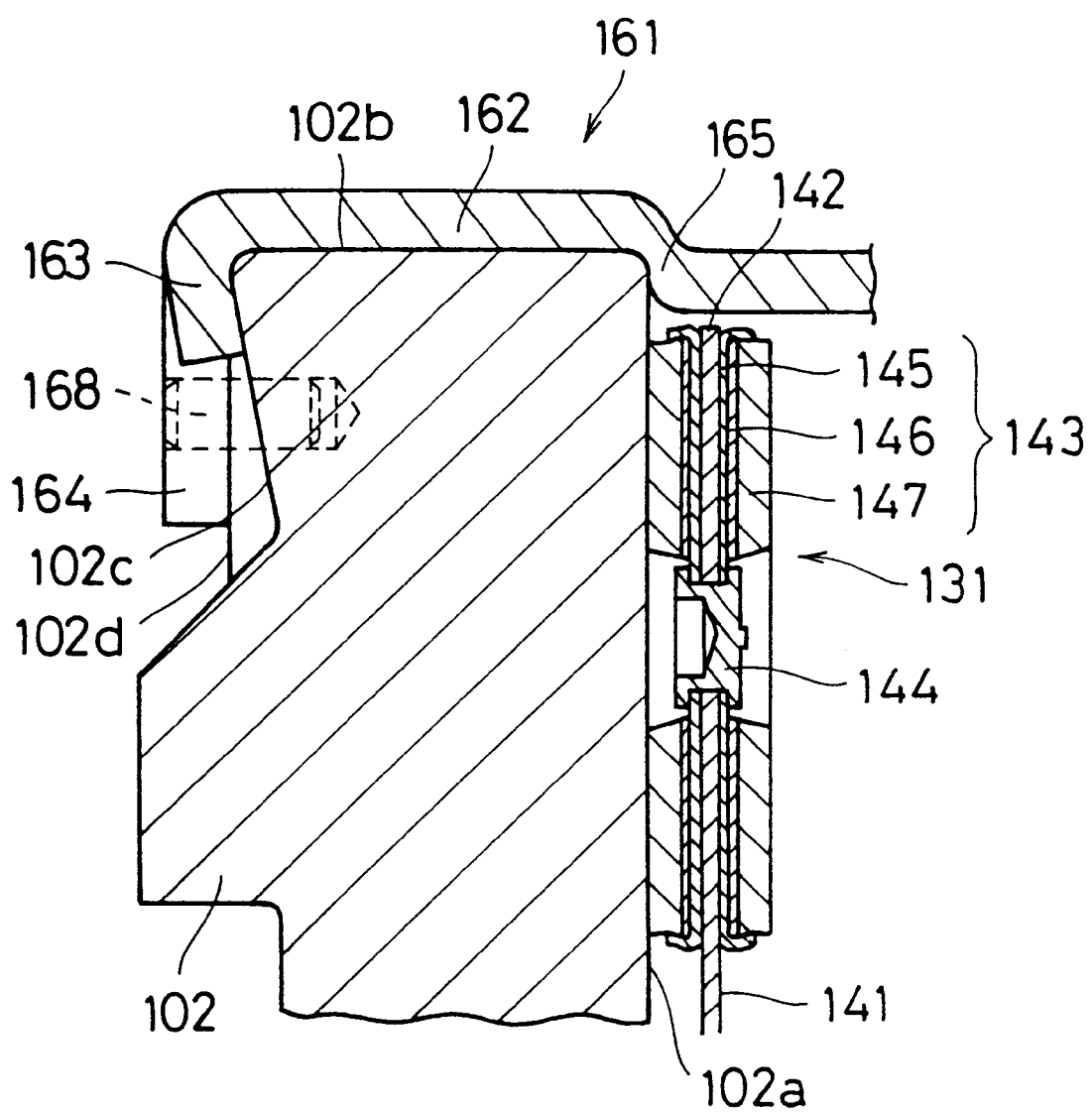
FIG. 6 is a fragmentary, cross-sectional view of the fixture portion of the clutch cover and the flywheel taken along the line VI—VI in FIG. 5, looking in the direction of the arrows.

As shown in FIGS. 5 and 6, a plurality of slant grooves 102c extending in the circumferential direction are formed on a side surface on the engine side of the outer circumferential portion of the flywheel 2. Each of the slant grooves 102c is slanted so that a depth of the groove is increased from the outer circumferential side to the inner circumferential side. A flat portion 102d is formed between the adjacent slant grooves 102c in the circumferential direction. The flat portion 102d has, at the substantially central portion thereof, a hole having a predetermined depth.

The clutch cover assembly 103 is mainly composed of a clutch cover 121, a pressure plate 122 and the diaphragm spring 123. The clutch cover 121 is made of a dish-like plate member. The clutch cover 121 has a large central hole in the central portion thereof. An outer circumferential wall of the clutch cover 121 extends in the axial direction and the end portion thereof is fixed to the outer circumferential portion of the flywheel 102.

The cover fixture portion 161 for fixing the flywheel 102 and the clutch cover 121 to each other will be explained with reference to FIGS. 5 and 6. An outer circumference covering portion 162 formed at the end of the clutch cover 121 in the axial direction is adapted to cover and come into contact with an outer circumferential surface 102b of the flywheel 102. Press fit portions 163 are formed at the end of the outer circumference covering portion 162 corresponding to the slant grooves 102c, and fixture portions 164 are formed corresponding to the flat portions 102d. The press fit portions 163 are bent to surround the slant grooves 102c of the flywheel 102. The fixture portions 164 extend radially inwardly longer than the press fit portions 163 and come into intimate contact with the flat portions 102d. The fixture portions 164 are fixed to the flat portions 102d by a pin 168. As a result, the flywheel 102 and the clutch cover 121 are prevented from rotating relative to each other. Furthermore, a contact portion 165 which is press-fitted radially inwardly and brought from the transmission side into contact with an outer circumferential edge of the frictional surface 102a of the flywheel 102 is formed in the outer circumferential portion of the clutch cover 121. During manufacturing, the surface of the contact portion 165 in contact with the frictional surface 102a is subjected to a cutting work. Thus, when the clutch cover 121 is engaged with the outer circumferential portion of the flywheel 102, the cutting-worked surface is brought into contact with the flywheel 102 on the frictional surface 102a side to thereby position the flywheel 102 and the clutch cover 121 in the axial direction.

The advantage of the structure of the cover fixture portion 161 in this embodiment is that fastening members such as bolts may be dispensed with, so that the weight as a whole may be reduced. Also, since the flywheel 102 and the clutch cover 121 are positioned in the axial direction by the press fit portions 163 of the clutch cover 121, knock pins or the like may be dispensed with so that the structure may be less costly. Furthermore, since the clutch cover 121 is fixed to the flywheel 102 by the press fitting of the outer circumferential end portion, it is possible to mount the clutch cover 121 onto the clutch cover 121 without fail in a simple method.

The pressure plate 122 is an annular member disposed on the inner circumferential side of the clutch cover 121. The pressure plate 122 is provided with a pressure surface 122a facing the flywheel 102. Also, the pressure plate 122 is provided on the opposite side to the pressure surface 122a with an annular projection 122b projecting in the axial direction. A plurality of strap plates 124 extending in the tangential direction are fixed at the one-sided ends thereof by bolts 128 to the outer circumferential portion of the pressure plate 122. The other sided ends of the strap plates 124 are fixed to the clutch cover 121. The pressure plate 122 rotates together with the clutch cover 121 due to the connection through the strap plates 124.

The diaphragm spring 123 is disposed between the pressure plate 122 and the clutch cover 121. The diaphragm spring 123 is composed of an annular elastic portion 123a and a plurality of lever portions 123b extending radially inwardly from the elastic portion 123a. The elastic portion 123a is brought into contact with the annular projection 122b of the pressure plate 122 at its outer circumferential portion with its inner circumferential portion being supported by a support structure 125, described below. The support structure 125 is composed of a plurality of stud pins 126 and two wire rings 127. The plurality of stud pins 126 are fixed to the inner circumferential side of the bottom portion of the clutch cover 121 at one-sided end, and extend on the engine side to pass through oblong holes 123c of the diaphragm spring 123. The two wire rings 127 are supported by the plurality of stud pins 126. The inner circumferential portion of the elastic portion 123a is interposed between the two wire rings 127. Under this condition, the elastic portion 123a urges the pressure plate 122 toward the flywheel 102.

The release device 108 is disposed at one-sided ends (inner circumferential end portions), on the transmission side, of the plurality of lever portions 123b of the diaphragm spring 123. When the release device 108 urges the lever portions 123b toward the engine, the biasing force that acts from the elastic portion 123a to the pressure plate 122 is released.

The clutch disc assembly 104 is mainly composed of a clutch coupler 131 disposed between the flywheel 102 and the pressure plate 122, a clutch plate 132 and a retaining plate 133 as an input member, a hub 134 as an output member, coil springs 136 disposed between the plates 132 and 133 and a flange 135, and a friction generating mechanism 137. The hub 134 has a boss 134a and the flange 135 formed integrally with the outer circumferential portion of the boss 134a. Spline holes 134b that engage with the main drive shaft 106 are formed in the central portion of the boss 134a. The clutch plate 132 and the retaining plate 133 are disc-like members disposed on both surfaces of the flange 135. The clutch plate 132 and the retaining plate 133 are fixed to each other at the outer circumferential portions by stopper pins 138. The coil springs 136 are disposed within window holes formed in the flange 135 and the plates 132 and 133. The friction generating mechanism 137 is composed of a plurality of washers disposed between the plates 132 and 133 and the flange 135.

As shown in FIG. 6, the clutch coupler 131 is composed of a disc plate 141 fixed to the clutch plate 132, and a plurality of frictional pads 143 fixed to the disc plate 141. The disc plate 143 is a disc-like member fixed to the outer circumferential portion of the clutch plate 132 by rivets 139 at its inner circumferential portion. Three projections 142 extending from the outer circumferential edge are formed on the disc plate 141. Two frictional pads 143 are fixed to each side of the each projection 142 so that four frictional pads 143 are fixed in total. Each frictional pad 143 is composed of a core plate 145 and a sintered member 147. The core plate 145 of each frictional pad 143 on both sides of the projection 142 is fixed by two rivets 144. Holes are formed in the sintered member 147 corresponding to the rivets 144.

The center bolt 70 is a member that is assembled into the modular clutch 1 in advance and that is generally not separated from the modular clutch 1 during storing and subsequent delivery. The center bolt 70 is disposed between the inner circumferential portions of the flexible plate 107 and the flywheel 102. The center bolt 70 is composed of a flange 71 and a sleeve-like fastening portion 72 extending from the flange 71 in the axial direction. A hole 73 that passes in the axial direction is formed in the central portion of the flange 71. The hole 73 is provided with corrugation 73a that can be engaged with a tool (not shown) in a manner described above with the previously described embodiments. A male screw 74 is formed on the outer circumference of the sleeve-like fastening portion 72. Furthermore, a bearing 75 is fixed to the inner circumferential portion of the sleeve-like fastening portion 72 by a snap ring 76 that is fixed to the inner circumferential surface of the sleeve-like fastening portion 72 and is in contact with an end of an outer race of the bearing 75 on the engine side.

The crankshaft 60 will be explained and the coupling of the crankshaft 60 and the modular clutch 1 will be explained.

A central recess 62 is formed at the end face of the crankshaft 60. A female screw 63 is formed in the inner circumferential surface of the central recess 62. Engagement recesses 61 are formed at two positions at the end face around the central recess 62.

A projection 101a of a plate member 11 fixed to the flexible plate 107 is fitted in the engagement recess 62 of the crankshaft 60. Also, the male screw 74 of the sleeve-like fastening portion 72 of the center bolt 70 is threadedly engaged with the male screw 63 of the central recess 62 of the crankshaft 60. Under this condition, the flange 71 clamps the inner circumferential portion of the flexible plate 103 and the inner circumferential portion of the plate member 11 in cooperation with the outer circumferential portion of the end face of the crankshaft 60. As a result, the inner circumferential portion of the flexible plate 107 is firmly coupled to the crankshaft 60 to provide a structure for transmitting the torque between the two components.

The effect obtained by the center bolt 70 is the same as that of the first embodiment.

FOURTH EMBODIMENT

Figure 7:
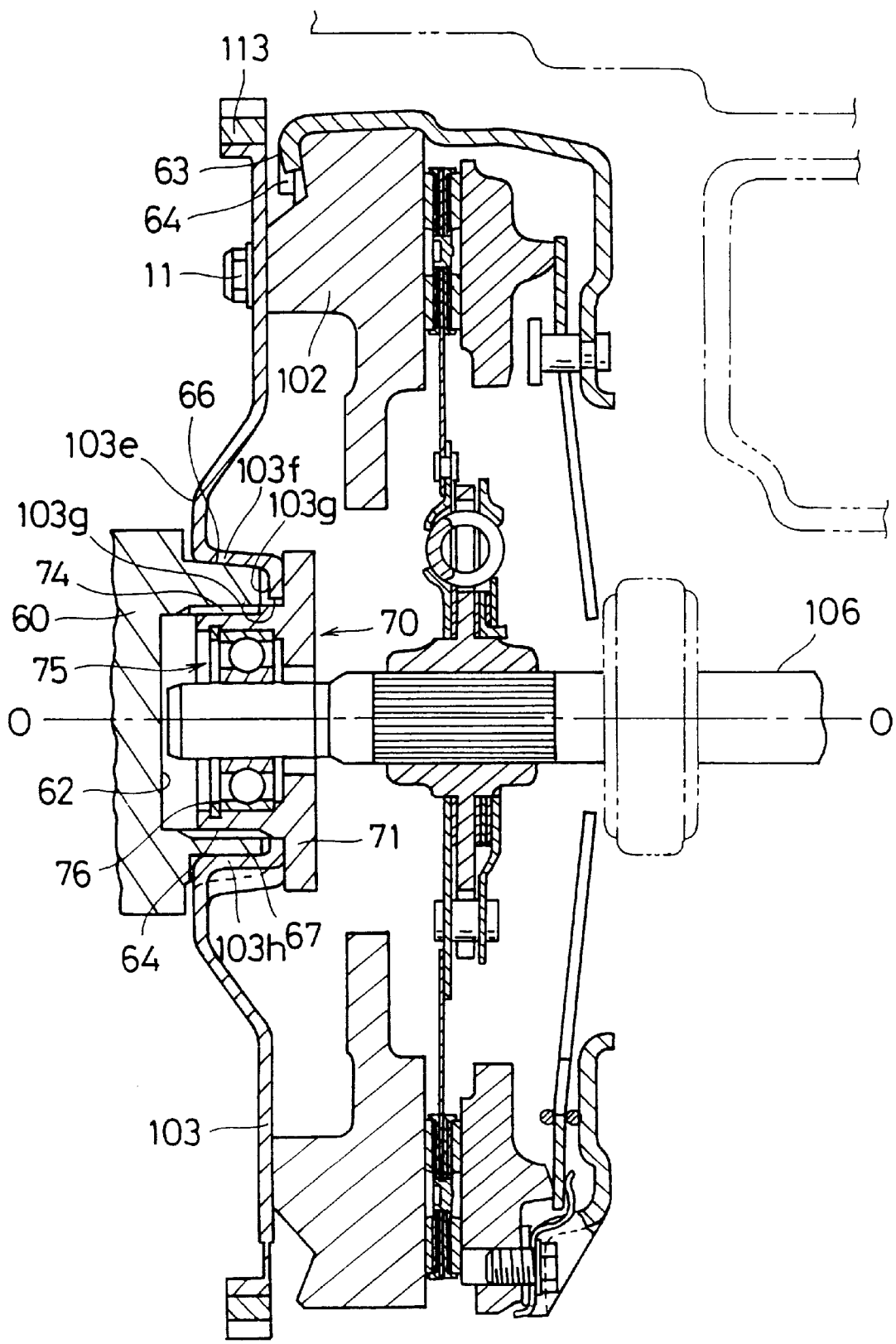
FIG. 7 is a fragmentary, cross sectional side view showing a clutch device according to a fourth embodiment of the present invention.

A fourth embodiment is shown in FIG. 7. One main feature of the embodiment shown in FIG. 7 is a coupling structure between the clutch device 101 and the crankshaft 60. The clutch cover, clutch disk and pressure plate configuration is similar to that described with respect to the third embodiment and therefore will not be repeated.

In the fourth embodiment, an annular bent portion 103e is formed in an inner circumferential portion of a flexible plate 103 by a drawing work. A wall surface of the inner circumferential portion of the annular bent portion 103e is formed into a tapered surface 103f that has a radius increased toward the engine. A disc portion 103g extending radially inwardly is formed in the inner circumferential side of the annular bent portion 103e. Furthermore, a projection 103h that extends radially inwardly is formed at one position of the annular bent portion 103e.

A tapered surface 66 that has a diameter decreased toward its end is formed in an outer circumference of an end of the crankshaft 60. A key groove 67 is formed at one position of the tapered surface 66. The projection 103h of the flexible plate 103 is fitted in the key groove 67 for preventing the crankshaft 60 and the flexible plate 103 from rotating relative to each other. The tapered surface 103f of the flexible plate 103 is in contact with the tapered surface 66 of the crankshaft 60. The disc portion 103g is disposed between the end of the crankshaft 60 and a flange 71 of a center bolt 70 and is in contact with the flange 71 only.

Under the assembled condition shown in FIG. 7, a sleeve-like fastening portion 72 of a center boss 70 is fastened to a central recess 62 of the crankshaft 60 so that the tapered surface 103f of the flexible plate 103 is urged toward the tapered surface 66 of the crankshaft 60. As a result, the fixture between the flexible plate 103 and the crankshaft 60 becomes more intimate and secure. The disc portion 103g of the flexible plate 103 serves to prevent the center bolt 70 from being loosened between the flange 71 and the crankshaft 60 since in a tightened state the disc portion 103g is elastically deformed and thus imparts an resilient force against the center bolt 70.

FIFTH EMBODIMENT

Figure 8:
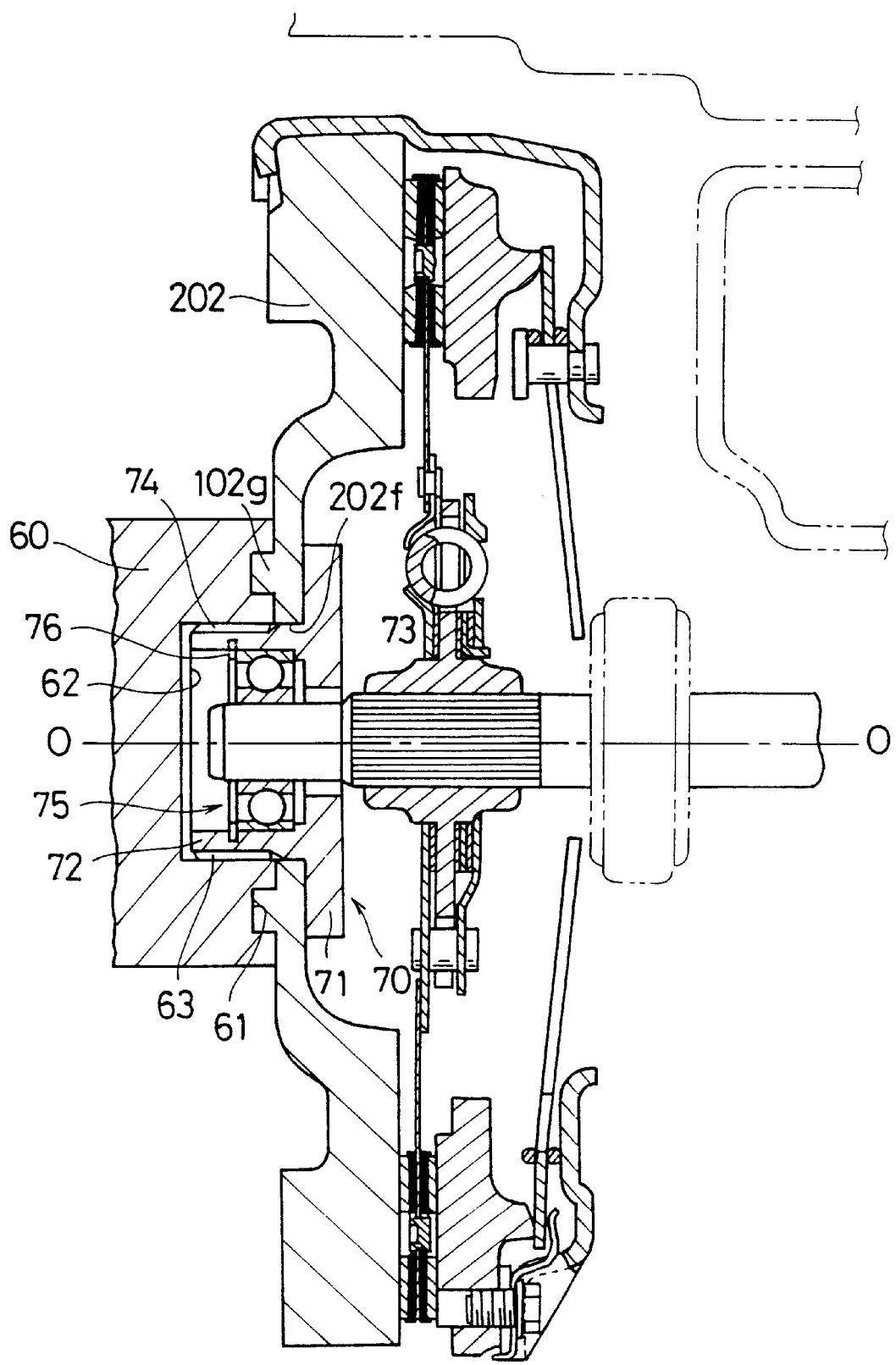
FIG. 8 is a fragmentary, cross sectional side view showing a clutch device according to a fifth embodiment of the present invention.

In a fifth embodiment, as shown in FIG. 8, inner circumferential portions of a flywheel 202 are fixed directly to the crankshaft 60. For instance, the inner circumferential portion of the flywheel 202 is clamped between the flange 71 of the center bolt 70 and the crankshaft 60. Projections 102g formed on the surface of the inner circumferential portion of the flywheel 202 on the engine side extend into recesses 61 of the crankshaft 60. Thus, the torque is transmitted between the two components.

SIXTH EMBODIMENT

Figure 9:
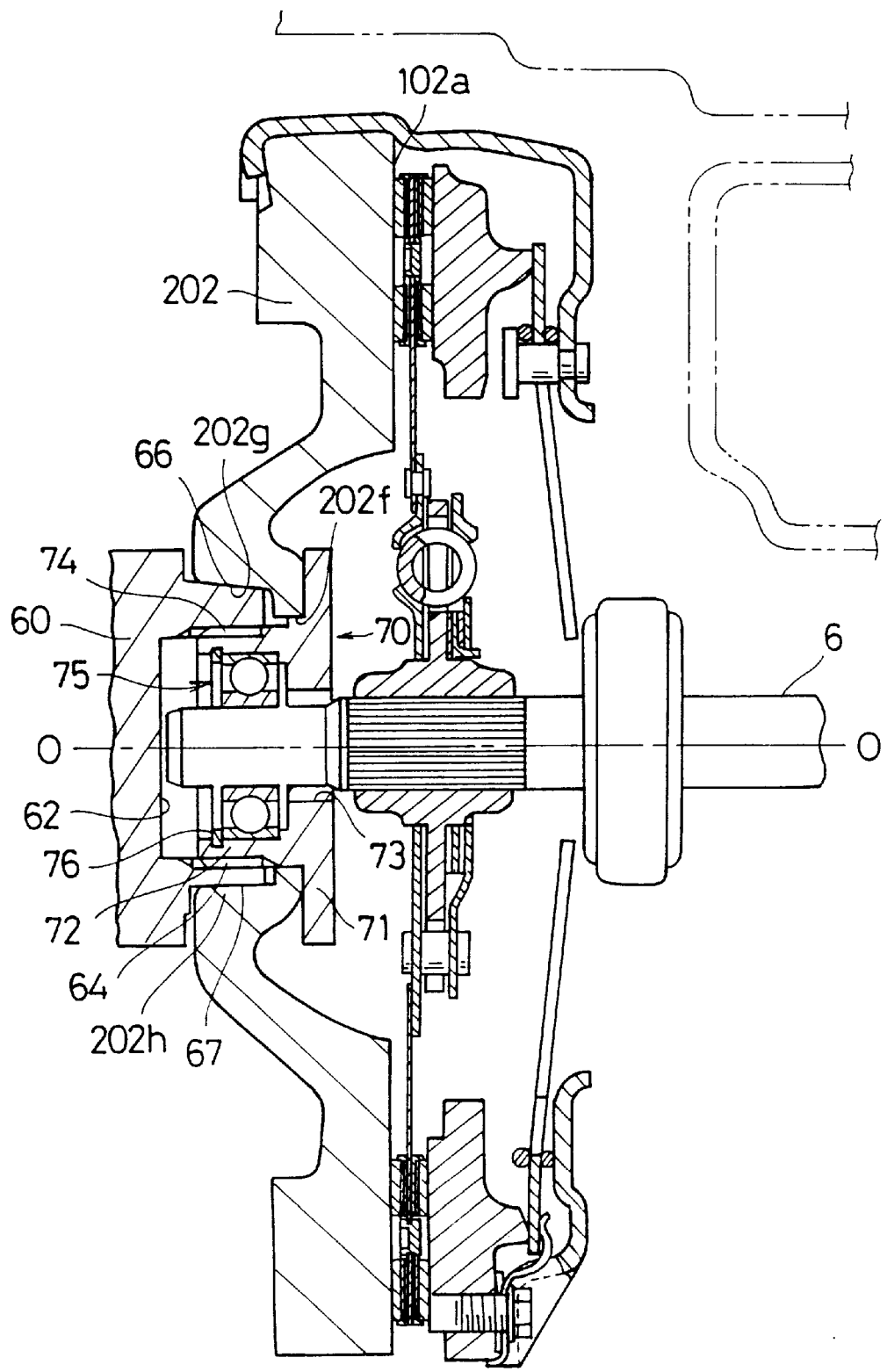
FIG. 9 is a fragmentary, cross sectional side view showing a clutch device according to a sixth embodiment of the present invention.

As shown in FIG. 9, an inner circumferential surface of a center hole of a flywheel 202 is formed with a tapered surface 202g that has a diameter that increases toward the engine side. The tapered surface 202g is brought into contact with a tapered surface 66 formed in an outer circumferential surface of an end of the crankshaft 60. A projection 202h extending radially inwardly is formed at one position of the tapered surface 202g. The projection 202h is fitted in a key groove 67 formed in the tapered surface 66 of the crankshaft 60 so that the flywheel 202 is prevented from rotating relative to the crankshaft 60. A disc portion 202f extending radially inwardly is formed about the center hole of the flywheel 202 on the transmission side. The disc portion 202f is interposed between the crankshaft 60 and the flange 71 and comes in contact with the flange 71.

Under the assembled condition shown in the figure, the sleeve-like fastening portion 72 of the center boss 70 is fastened to the central recess 62 of the crankshaft 60 so that the tapered surface 202g of the flywheel 202 is biased to the tapered surface 66 of the crankshaft 60. For this reason, the fixture between the flywheel 202 and the crankshaft 60 is more firmly effected.

In the modular clutch according to the present invention, only by manipulation of the center bolt assembled in the modular clutch, is it possible to install and remove the modular clutch from the crankshaft.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A modular clutch, comprising:

a flywheel formed with a center hole and a radially extending friction surface;

a clutch cover assembly fixed to said flywheel, a pressure plate supported within said clutch cover, said pressure plate being formed with a pressure surface facing said friction surface, a diaphragm spring supported within said clutch cover assembly biasing said pressure plate toward said friction surface;

a clutch disc assembly having a friction facings interposed between said friction surface and said pressure surface, said clutch disc assembly further formed with a hub having a spline hole configured to engage a transmission input shaft;

a center bolt formed with a flange and a threaded portion, said flange being disposed on one side of said flywheel and said threaded portion extending through said center hole, said threaded portion being configured for engagement with corresponding threads in a crankshaft of an engine such that said center bolt attaches said modular clutch assembly to the crankshaft of the engine; and wherein said flywheel comprises an annular inertia mass and a flexible plate having an outer circumferential portion fixed to said inertia mass, said flexible plate formed with said center hole, and said flexible plate formed with a protruding engagement portion for engaging a corresponding recess formed in the crankshaft to prevent relative rotation between the crankshaft and said flexible plate.

2. The modular clutch as set forth in claim 1, wherein said flywheel further comprises a flywheel member and a damper assembly disposed between said inertia mass and said flywheel member, said flywheel member being formed with said friction surface, and said damper assembly allowing only limited relative rotary displacement between said flywheel member and said inertia mass.

3. The modular clutch as set forth in claim 1, wherein said flexible plate is formed with a conical shaped hub defining a radially inner tapered surface that is configured to engage a corresponding surface formed on the crankshaft, said conical shaped hub having a disc portion formed at one end thereof, said one end having an inner diameter that is smaller than the smallest diameter of the corresponding surface formed on the crankshaft, wherein with said tapered surface engaged with the crankshaft and said center bolt tightly threaded into the crankshaft, said disc portion is spaced apart from an end of the crankshaft.

4. A modular clutch, comprising:

a flywheel formed with a center hole and a radially extending friction surface;

a clutch cover assembly fixed to said flywheel, a pressure plate supported within said clutch cover, said pressure plate being formed with a pressure surface facing said friction surface, a diaphragm spring supported within said clutch cover assembly biasing said pressure plate toward said friction surface;

a clutch disc assembly having a friction facings interposed between said friction surface and said pressure surface, said clutch disc assembly further formed with a hub having a spline hole configured to engage a transmission input shaft;

a center bolt formed with a flywheel and a threaded portion, said flange being disposed on one side of said flywheel and said threaded portion extending through said center hole, said threaded portion being configured for engagement with corresponding threads in a crankshaft of an engine such that said center bolt attaches said modular clutch assembly to the crankshaft of the engine; and wherein said flywheel is formed with a conical shaped hub defining a radially inner tapered surface that is configured to engage a corresponding surface formed on the crankshaft, said conical shaped hub having a disc portion formed at one end thereof, said one end having an inner diameter that is smaller than the smallest diameter of the corresponding surface formed on the crankshaft, wherein with said tapered surface engaged with the crankshaft and said center bolt tightly threaded into the crankshaft, said disc portion is spaced apart from an end of the crankshaft.

5. The modular clutch as set forth in claim 4, wherein said radially inner tapered surface is formed with a protruding engagement portion for engaging a corresponding recess formed in the crankshaft to prevent relative rotation between the crankshaft and said flywheel.

6. A modular clutch, comprising:

a flywheel assembly having a flexible plate, an inertia mass attached to an outer circumference of said flexible plate, a damper assembly attached to said inertia mass and a flywheel member attached to said damper assembly, said damper assembly configured to allow limited relative rotary displacement between said inertia member and said flywheel member, said flexible plate formed with a center hole and said flywheel member having a radially extending friction surface;

a clutch cover assembly fixed to said flywheel member, a pressure plate supported within said clutch cover, said pressure plate being formed with a pressure surface facing said friction surface, a diaphragm spring supported within said clutch cover assembly biasing said pressure plate toward said friction surface;

a clutch disc assembly having a friction facings interposed between said friction surface and said pressure surface, said clutch disc assembly further formed with a hub having a spline hole configured to engage a transmission input shaft;

a center bolt formed with a flange and a threaded portion, said flange being disposed on one side of said flexible plate and said threaded portion extending through said center hole, said threaded portion being configured for engagement with corresponding threads in a crankshaft of an engine such that said center bolt attaches said modular clutch assembly to the crankshaft of the engine; and wherein said flexible plate formed with a protruding engagement portion for engaging a corresponding recess formed in the crankshaft to prevent relative rotation between the crankshaft and said flexible plate.

7. The modular clutch as set forth in claim 6, wherein said flexible plate is formed with a conical shaped hub defining a radially inner tapered surface that is configured to engage a corresponding surface formed on the crankshaft, said conical shaped hub having a disc portion formed at one end thereof, said one end having an inner diameter that is smaller than the smallest diameter of the corresponding surface formed on the crankshaft, wherein with said tapered surface engaged with the crankshaft and said center bolt tightly threaded into the crankshaft, said disc portion is spaced apart from an end of the crankshaft.

* * * * *